United States Patent [19]
Fujimori et al.

[11] Patent Number: 5,310,247
[45] Date of Patent: May 10, 1994

[54] VEHICLE SEATS

[75] Inventors: Takashi Fujimori, Toyota; Kazuhisa Tatematsu, Nagoya; Kunio Nishiyama, Susono; Takakazu Mori, Toyota, all of Japan

[73] Assignees: Araco K.K.; Toyota Jidosha K.K., both of Aichi, Japan

[21] Appl. No.: 35,578

[22] Filed: Mar. 23, 1993

[30] Foreign Application Priority Data

Mar. 23, 1992 [JP] Japan ............................ 4-015185[U]
Jun. 5, 1992 [JP] Japan ................................ 4-145492
Jun. 5, 1992 [JP] Japan ................................ 4-145499

[51] Int. Cl.$^5$ ............................................. B60N 2/22
[52] U.S. Cl. ........................... 297/378.12; 297/216.14; 297/452.18
[58] Field of Search ...................... 297/216.14, 378.12, 297/452.18, 452.20

[56] References Cited

U.S. PATENT DOCUMENTS 2,712,344 7/1955 Weber ........................ 297/378.12 X
3,761,127 9/1973 Giese et al. ........................ 297/389
5,246,271 9/1993 Boisset ....................... 297/378.12 X

FOREIGN PATENT DOCUMENTS 60-21710 2/1985 Japan.
1-77533 7/1988 Japan.

Primary Examiner—Peter R. Brown
Attorney, Agent, or Firm—Fisher & Associates

[57] ABSTRACT

A vehicle seat having a backrest hinged to a seat squab frame by means of a pair of reclining mechanisms to be tilted forwardly or backwardly with respect to the seat squab frame, the reclining mechanisms each including a ratchet member secured to each side of the lower end portion of the backrest frame to be locked to a support member secured to each side of the rear end portion of the seat squab frame, which vehicle seat includes a single strut member rotatably connected at its upper end to an upper end of the backrest at one side thereof to be moved forwardly or backwardly, and a resilient member mounted on the upper end of the backrest frame for biasing the strut member forwardly, wherein the ratchet member located at the same side as the one side of the backrest is formed with a semi-circular elongated hole of which the radius center is located at a rotation fulcrum of the strut member, and wherein the lower end of the strut member is slidably engaged with the semi-circular elongated hole and is normally positioned at a forward end of the elongated hole under load of said resilient member.

3 Claims, 7 Drawing Sheets

VEHICLE SEATS

BACKGROUND OF THE INVENTION

1. Field of the Invention

The present invention relates to a seat construction for motor vehicles, and more particularly to a vehicle seat of the type having a backrest member hinged to a seat squab member to be tilted forwardly or backwardly with respect to the seat squab member.

2. Discussion of the Prior Art

In Japanese Utility Model Laid-open Publication No. 1-77533 and Patent Laid-open Publication No. 60-21710, there has been proposed a vehicle seat of the type which includes a seat squab frame, a backrest frame hinged for angular adjustment relative to the seat squab frame, and a strut member connected at its opposite ends to an upper end of the backrest frame at one side thereof and to one side of the scat squab frame. The strut member acts as a reinforcement member to resist an excessive forward force acting on the backrest frame in the occurrence of vehicle collision. To enhance the reinforcement function of the strut member, it is advantageous that the lower end of the strut member is connected to the one side of the seat squab frame at a position displaced as forwardly as possible.

However, if the lower end of the strut member was displaced forwardly, the strut member would become an obstacle to ingress or egress of a passenger from the vehicle seat. To avoid such a problem, the strut member of the vehicle seat disclosed in the former Laid-open Publication No. 1-77533 is in the form of a support mechanism composed of three support rods mutually connected in a truss construction, wherein the joint portion of the support rods is arranged at one side of the backrest to facilitate ingress or egress of a passenger from the vehicle seat. The support mechanism is, however, complicated in its construction and causes undesired movements at the mounting portions of the support rods.

The strut member of the vehicle seat disclosed in the latter Laid-open Publication No. 60-21710 is in the form of a pair of support rods telescopically connected to one another, wherein one of the support rods is connected at its lower end to one side of the seat frame while the other rod is connected to an upper end of the backrest frame at one side thereof, and wherein one of the support rods is provided with a locking mechanism which cooperates with a reclining mechanism of the vehicle seat. When the reclining mechanism is released from its locked condition to permit forward or backward movement of the backrest, the locking mechanism is released to permit relative movement of the supports rods. When the reclining mechanism is locked to retain the backrest at an adjusted position, the locking mechanism is locked to firmly connect the support rods to one another. However, the support rods become an obstacle to ingress or egress of the passenger from the vehicle seat. Since the locking mechanism is arranged to be interlocked with the reclining mechanism, the operability of the reclining mechanism is deteriorated.

SUMMARY OF THE INVENTION

It is, therefore, a primary object of the present invention to provide a vehicle seat wherein a single strut member is arranged to firmly support a backrest member of the vehicle seat against a forward force applied thereto in the occurrence of vehicle collision without causing the problems discussed above.

According to the present invention, the object is accomplished by providing a vehicle seat having a backrest hinged to a seat squab frame to be tilted forwardly or backwardly with respect to the seat squab frame, which comprises a single strut member rotatably connected at its upper end to an upper end of the backrest at one side thereof to be moved forwardly or backwardly, resilient means mounted on the upper end of the backrest frame for biasing the strut member forwardly, and a support member secured to or arranged to be locked to one side of the seat squab frame at the same side as the one side of the backrest frame for supporting the lower end of the strut member, the support member being formed with a semi-circular elongated hole of which the radius center is located at a rotation fulcrum of the strut member, wherein the lower end of the strut member is slidably engaged with the semi-circular elongated hole and is normally positioned at a forward end of the elongated hole under load of the resilient means.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
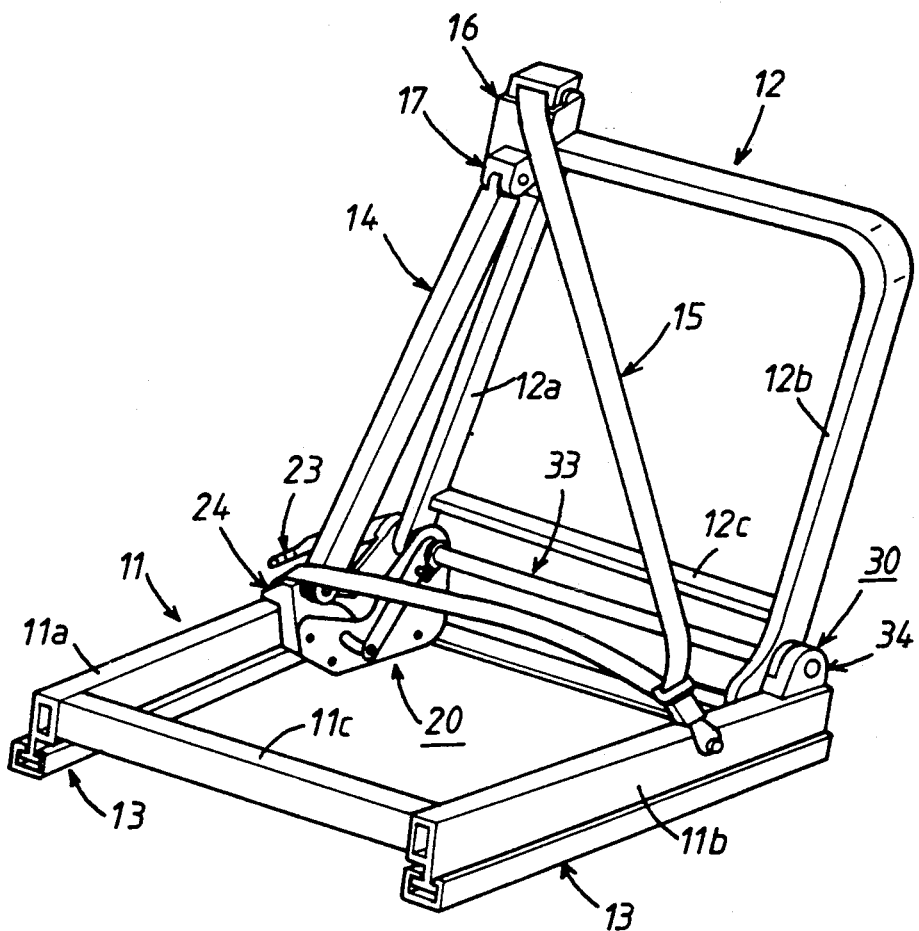
FIG. 1 is a perspective view illustrating a seat squab frame and a backrest frame of a vehicle seat in accordance with the present invention.

In FIG. 1 of the drawings, there is illustrated a seat squab frame 11 and a backrest frame 12 of a vehicle seat in accordance with the present invention. The seat squab frame 11 is composed of a pair of parallel side members 11a, 11b connected by a cross-member 11c to one another and slidably mounted on a pair of seat tracks 13, 13 which will be substantially horizontally located and fixed to the vehicle floor. The backrest frame 12 is composed of a U-shaped member of which the free ends are bridged by a cross-member 12c. The backrest frame 12 is hinged at its lower end to the rear end of seat frame 11 by means of a pair of reclining mechanisms 20, 30 so that the backrest frame 12 can be tilted forwardly or backwardly with respect to the seat frame 12.

Figure 2:
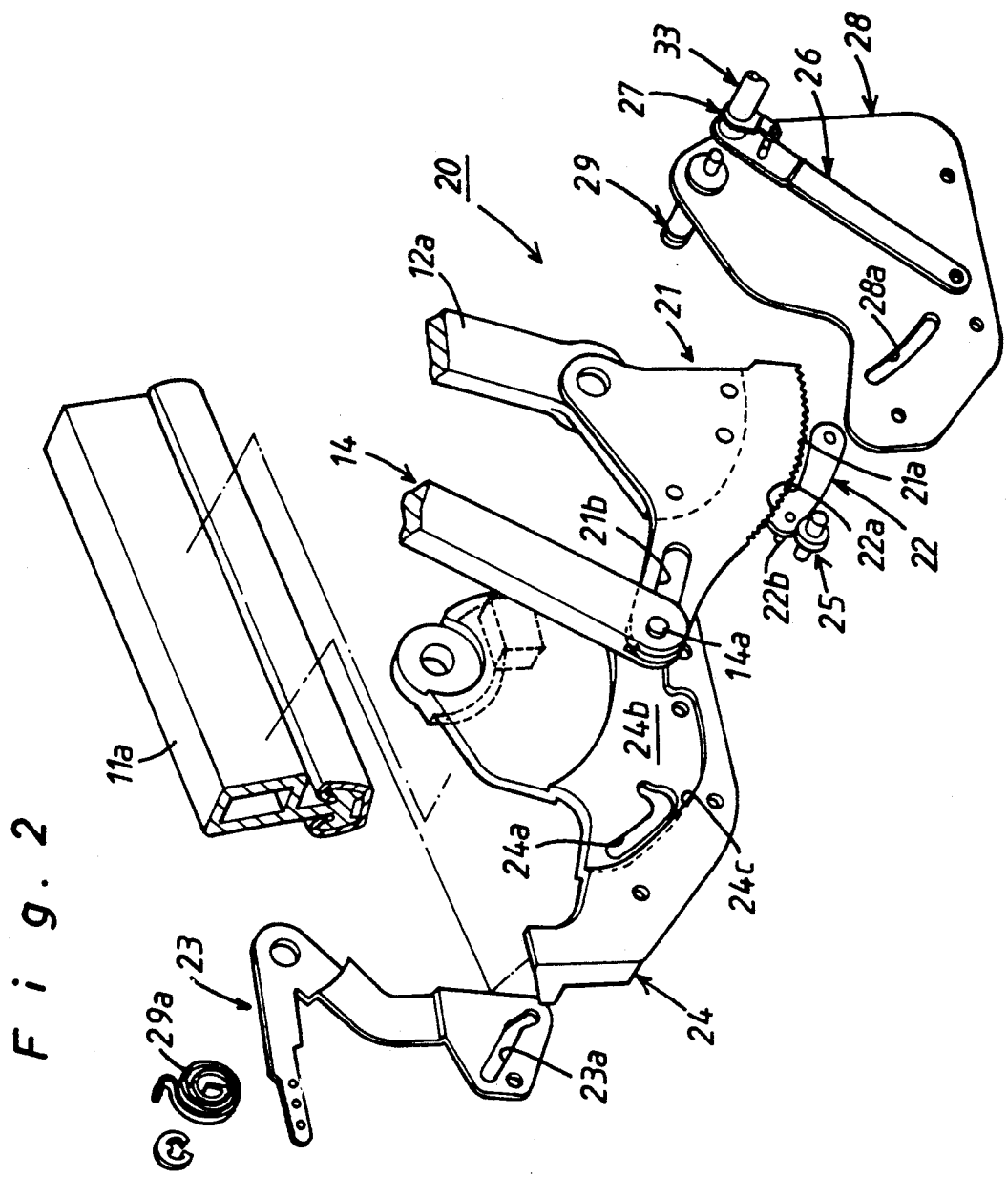
FIG. 2 is a perspective view of disassembled component parts of a right-hand reclining mechanism shown in FIG. 1.

The side members 11a and 11b of seat frame 11 each are integrally formed with an upper movable rail of the seat track 13. A retractor 16 of a seat belt 15 and a bracket 17 are secured to the upper end of the right-hand leg portion 12a of backrest frame 12. Arranged between the right-hand side member 11a of seat frame 11 and the right-hand leg portion 12a of backrest frame 12 is a single strut member 14 which is rotatably connected at its upper end to the bracket 17 to be moved forwardly or backwardly and at its lower end to a ratchet member 21 of the right-hand reclining mechanism 20 as shown in FIG. 2. The strut member 14 is loaded forwardly by means of a spring member assembled with the bracket 17.

Figure 3:
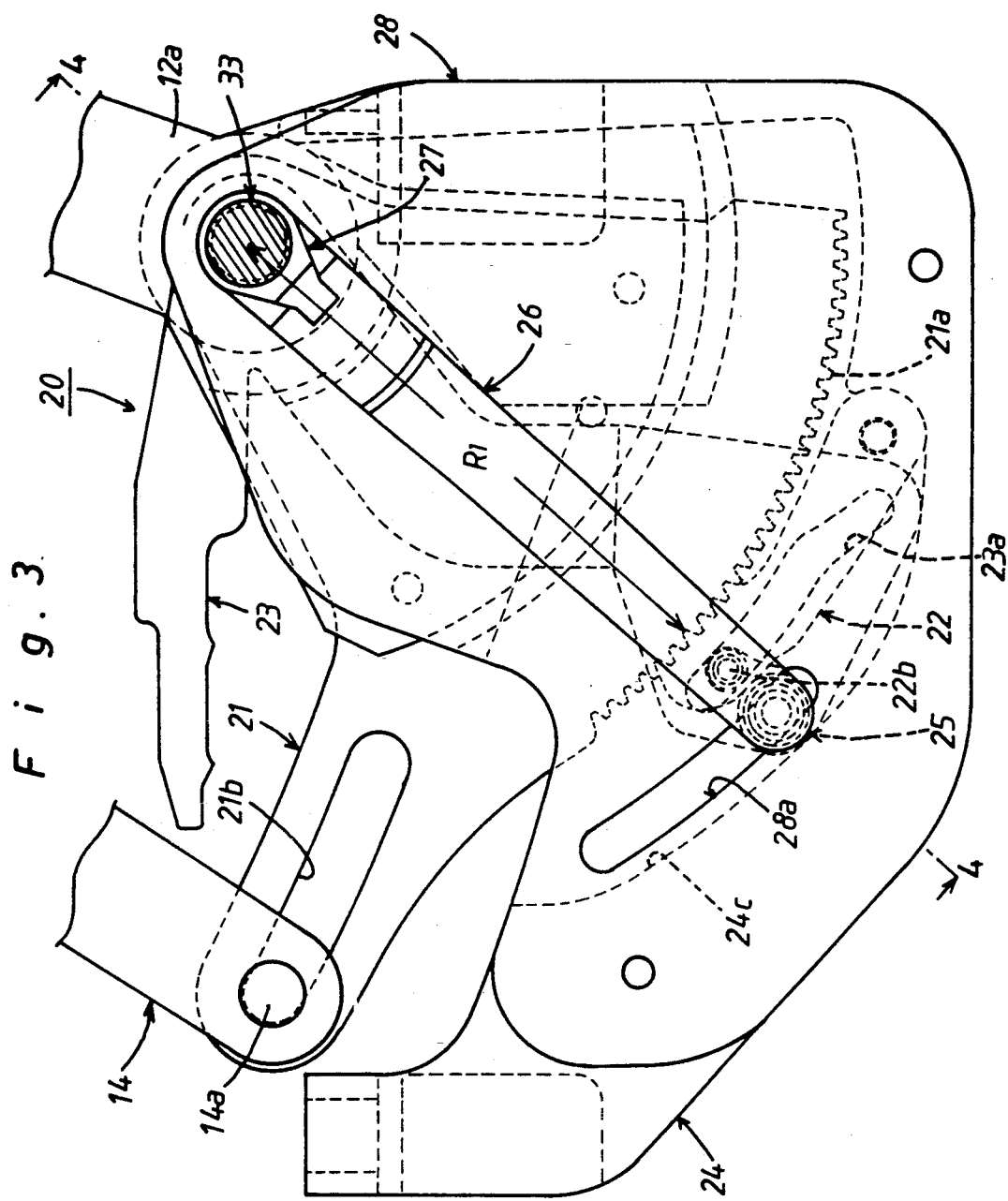
FIG. 3 is a side view of the right-hand reclining mechanism.
Figure 4:
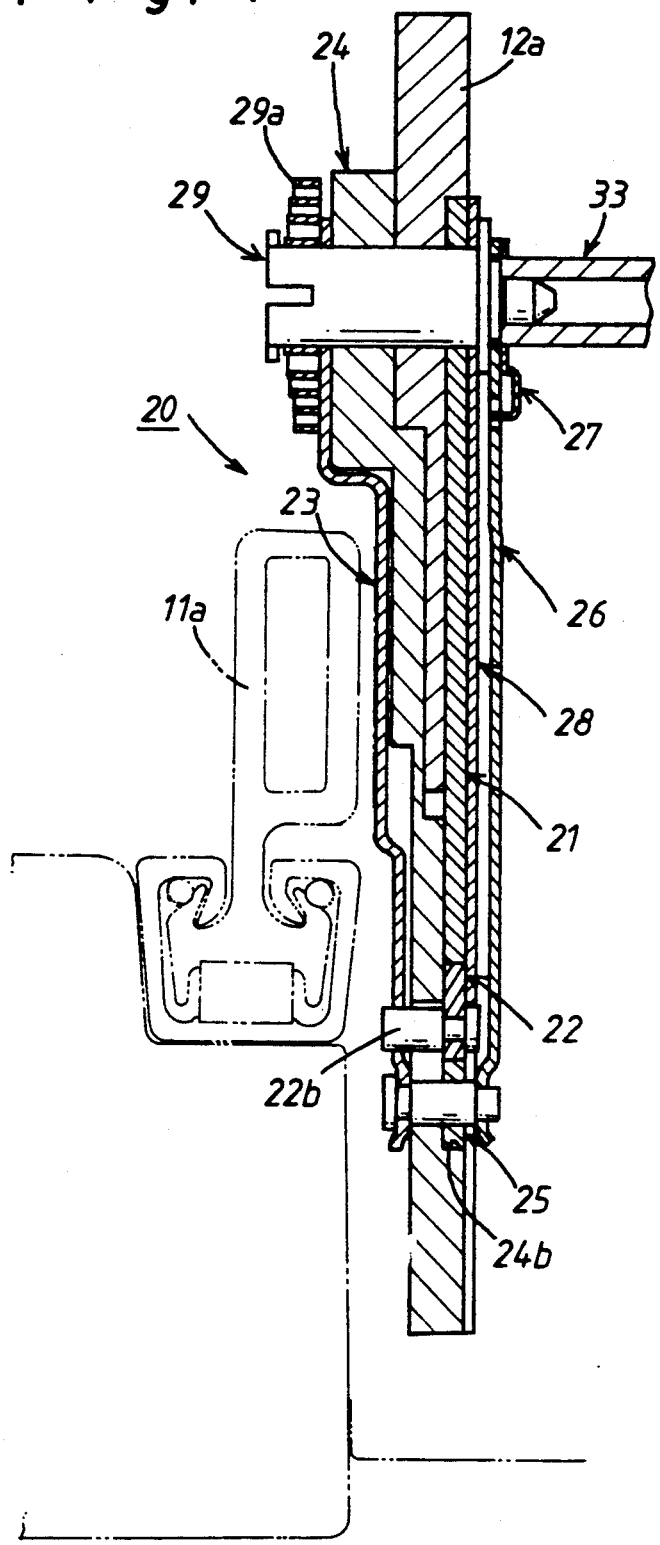
FIG. 4 is a sectional view taken along line 4—4 of FIG. 3.

As shown in FIGS. 2 to 4, the right-hand reclining mechanism 20 is composed of the ratchet member 21, a pawl 22, a release lever 23, a lower arm 24, a roller 25, an interlocking arm 26, a connecting lever 27 and a side cover member 28. The ratchet member 21 is secured to the lower end of the right-hand leg portion 12a of backrest frame 12 and has a semi-circular toothed portion 21a formed at its lower end and an arm portion formed with a semi-circular enlogated hole 21b of which the radius center is located at the rotation fulcrum of the upper end of strut member 14. The lower end of strut member 14 is assembled with the arm portion of ratchet member 21 by means of a support pin 14a to be movable along the semi-circular elongated hole 21b and to be normally positioned at the forward end of semi-circular elongated hole 21b under load of the spring member assembled with the bracket 17.

The lower arm 24 is secured to the rear end of the right-hand side member 11a of seat frame 11 and is rotatably connected to the lower end of the right-hand leg portion 12a of backrest frame 12 by means of a hinge pin 29 to permit forward or backward movement of the backrest frame 12. The side cover member 28 is secured to an inside surface of lower arm 24 so that the ratchet member 21 and pawl 22 are interposed between the side cover member 28 and the lower arm 24. The pawl 22 is formed with a toothed portion 22a for engagement with the toothed portion 21a of ratchet member 21 and is pivoted at its base end to the side cover member 28. The pawl 22 is contained within an inside recessed portion 24b of lower arm 24 and is provided with a cam pin 22b which is engaged with a cam slot 23a of the release lever 23 through a cam slot 24a of lower arm 24. As clearly shown in FIG. 4, the roller 25 is carried by the release lever 23 and interlocking lever 26 and contained within the inside recessed portion 24b of lower arm 24.

When located at the lower end of cam slot 24a, the roller 25 is maintained in engagement with the rear surface of pawl 22 to mesh the toothed portion 22a of pawl 22 with the toothed portion 21a of ratchet member 21. When moved upward by operation of the release lever 23, the roller 25 is disengaged from the rear surface of pawl 22 and in turn, the pawl 22 is disengaged from the ratchet member 21 by slidable engagement with the cam slot 23a at its cam pin 22b. In addition, as clearly shown in FIG. 4, a coil spring 29a is mounted on the hinge pin 29 to bias the backrest frame 12 forwardly.

Figure 5:
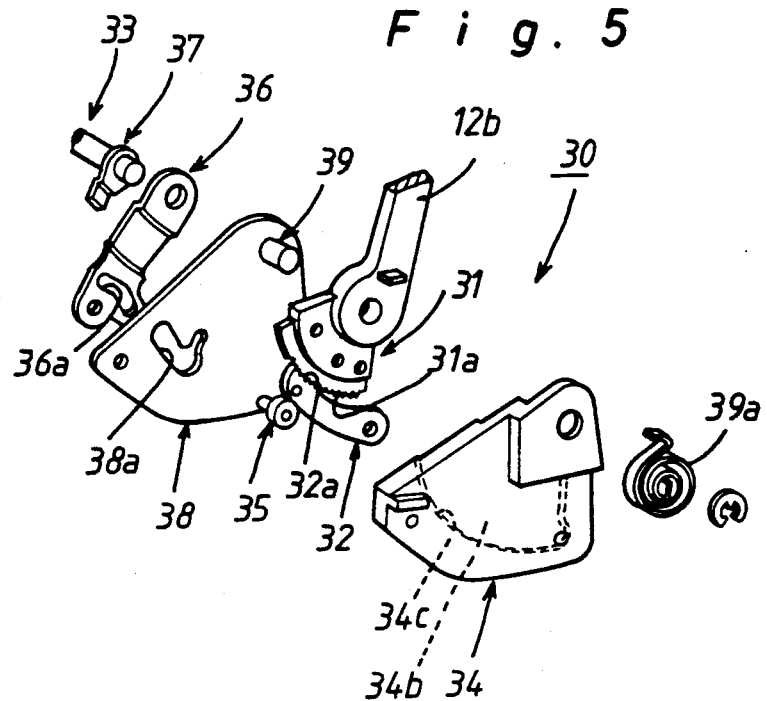
FIG. 5 is a perspective view of disassembled component parts of a left-hand reclining mechanism shown in FIG. 1.
Figure 6:
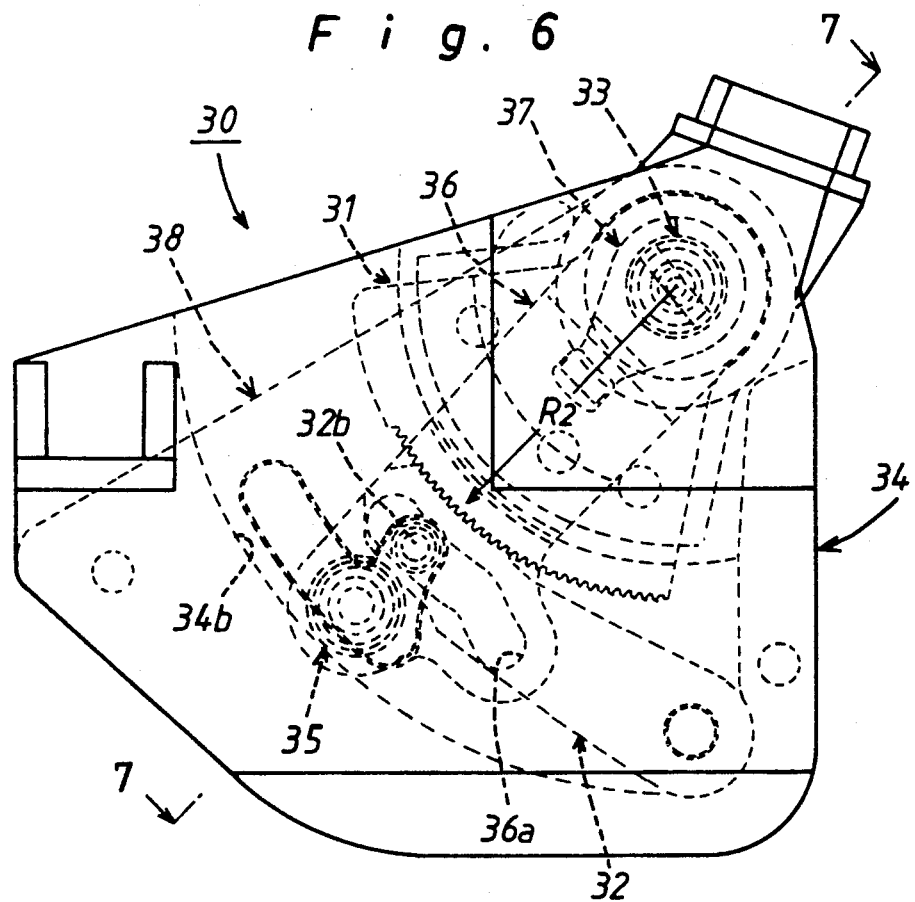
FIG. 6 is a side view of the left-hand reclining mechanism.
Figure 7:
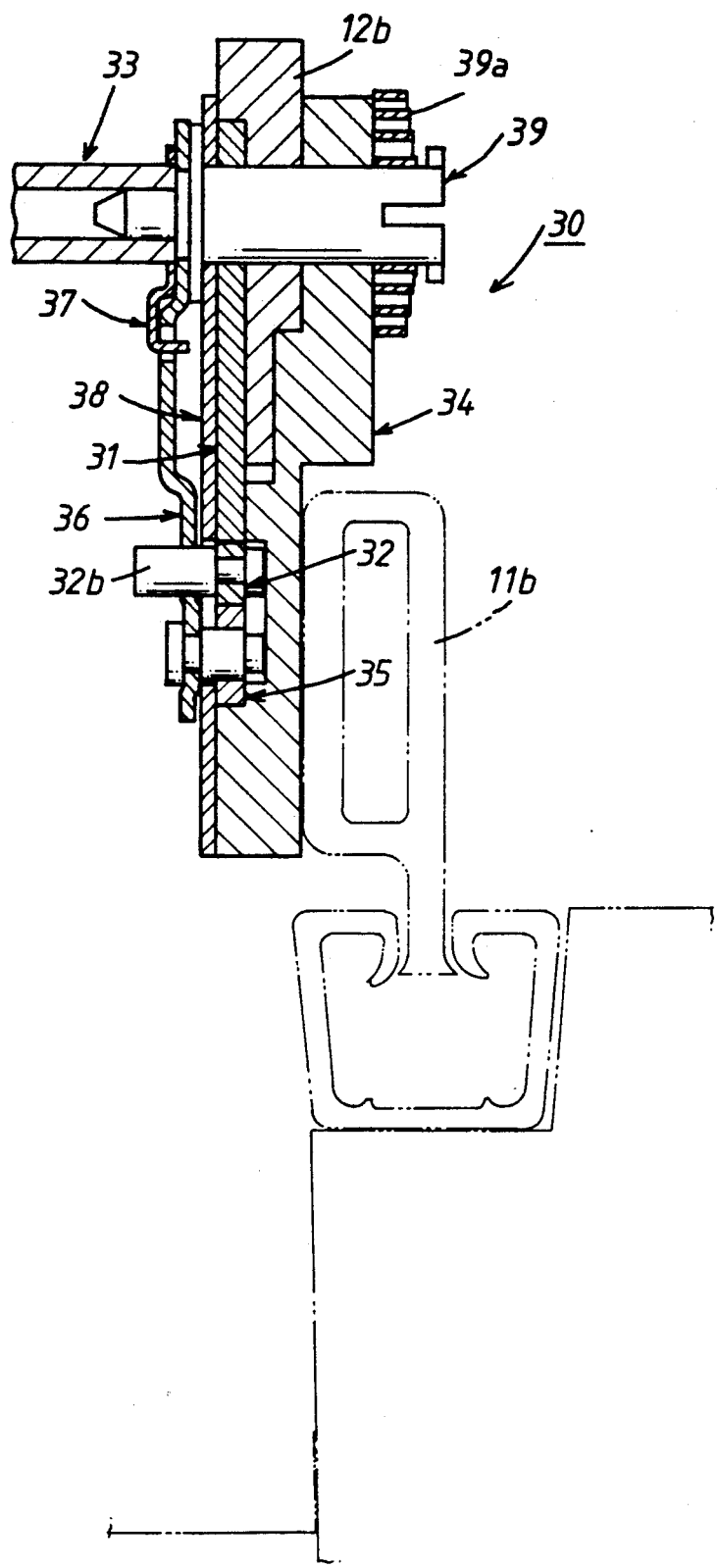
FIG. 7 is a sectional view taken along line 7—7 of FIG. 6.

The construction of the left-hand reclining mechanism 30 is substantially the same as that of the right-hand reclining mechanism 20, except that an interlocking arm 36 is replaced with the release lever 23. As shown in FIGS. 5 to 7, the left-hand reclining mechanism 30 includes a ratchet member 31, a pawl 32, a connecting rod 33, a lower arm 34, a roller 35, the interlocking arm 36, a connecting lever 37 and a side cover member 38. The ratchet member 31 is formed at its lower end with a semi-circular toothed portion 31a and is secured to the lower end of the left-hand leg portion 12b of backrest frame 12. The radius $R_2$ of curvature of the semi-circular toothed portion 31a is determined to be smaller than that $R_1$ of the toothed portion 21a of ratchet member 21 in the right-hand reclining mechanism 20.

The lower arm 34 is secured to the rear end of the left-hand side member 11b of seat frame 11 and is rotatably connected to the lower end of the left-hand leg portion 12b of backrest frame 12 by means of a hinge pin 39 to permit forward or backward movement of the backrest frame 12. The side cover member 38 is secured to an inside surface of the lower arm 34 in such a manner that the ratchet member 31 and pawl 32 are interposed between the lower arm 34 and side cover member 38. The pawl 32 is formed with a semi-circular toothed portion 32a for engagement with the toothed portion 31a of ratchet member 31. As clearly shown in FIG. 7, the pawl 32 is pivoted to the lower arm 34 and contained within an inside recessed portion 34b of lower arm 34. The pawl 32 is provided with a cam pin 32b which is engaged with a cam slot 36a of the interlocking arm 36 through a cam slot 38a of side cover member 38. The roller 35 is carried by the interlocking arm 36 and contained within the inside recessed portion 34b of lower arm 34.

When located at the lower end of cam slot 38a, the roller 35 is maintained in engagement with the rear surface of pawl 32 to mesh the toothed portion 32a of pawl 32 with the toothed portion 31a of ratchet member 31. When moved upward by operation of the interlocking arm 36, the roller 35 is moved upward along the inside stepped portion of lower arm 34 and disengaged from the pawl 32, and in turn, the pawl 32 is disengaged from the ratchet member 31 by slidable engagement with the cam slot 36a of interlocking arm 36 at its cam pin 32b. As shown in FIGS. 4 and 7, the connecting rod 33 is integrally provided thereon with the connecting levers 27, 37 at its opposite ends and is engaged at its opposite ends with the hinge pins 29 and 39. As shown in FIGS. 3, 4 and 6, 7, the connecting lever 27 is engaged with the interlocking arm 26 of right-hand reclining mechanism 20, while the connecting lever 37 is engaged with the interlocking arm 36 of left-hand reclining mechanism 30. Thus, the rotational effort applied to the release lever 23 is transmitted to the interlocking lever 36 of left-hand reclining mechanism 30 through the connecting rod 33. In addition, a coil spring 39a is mounted on the hinge pin 39 to bias the backrest frame 12 forwardly.

Hereinafter, the operation of the reclining mechanisms 20 and 30 will be described. When the pawls 22 and 32 are meshed with the toothed portions of ratchet members 21 and 31, the backrest frame 12 is locked at a selected position with respect to the seat frame 11. In such a locked condition, the ratchet member 21 is united with the backrest frame 12, and the lower end of strut member 14 is retained at the forward end of the semi-circular elongated hole 21b so that the strut member 14 acts as a reinforcement member for firmly supporting the backrest frame 12 at the selected position. When a passenger intends to get off the vehicle, he pushes the strut member 14 backwardly. In this instance, the lower end of strut member 14 retracts backwardly along the semi-circular elongated hole 21b of ratchet member 21 to permit easier egress of the passenger from the vehicle seat. When the pushing force applied to the strut member 14 is released after egress of the passenger, the lower end of strut member 14 is moved forwardly under load of the spring assembled with the upper bracket 17 and retained in the original position by engagement with the forward end of semi-circular elongated hole 21b. When the passenger intends to get on the vehicle, he pushes the strut member 14 backwardly. In this instance, the lower end of strut member 14 retracts backwardly along the semi-circular elongated hole 21b of ratchet member 21 to permit easier ingress of the passenger into the vehicle compartment. Since in this embodiment the strut member 14 is in the form of a single rod, the reinforcement construction of the vehicle seat can be simplified.

When it is desired to adjust an inclined angle of the backrest frame 12, the release lever 23 is operated to disengage the pawl 22 from the ratchet member 21 in the right-hand reclining mechanism 20. In this instance, the operation force of the release lever 23 is transmitted to the interlocking arm 36 of the left-hand reclining mechanism 30 through the connecting rod 33 to disengage the pawl 32 from the ratchet member 31. Thus, the reclining mechanisms 20 and 30 are released from their locked conditions to permit forward or backward movement of the backrest frame 12 without any obstacle.

Figure 8:
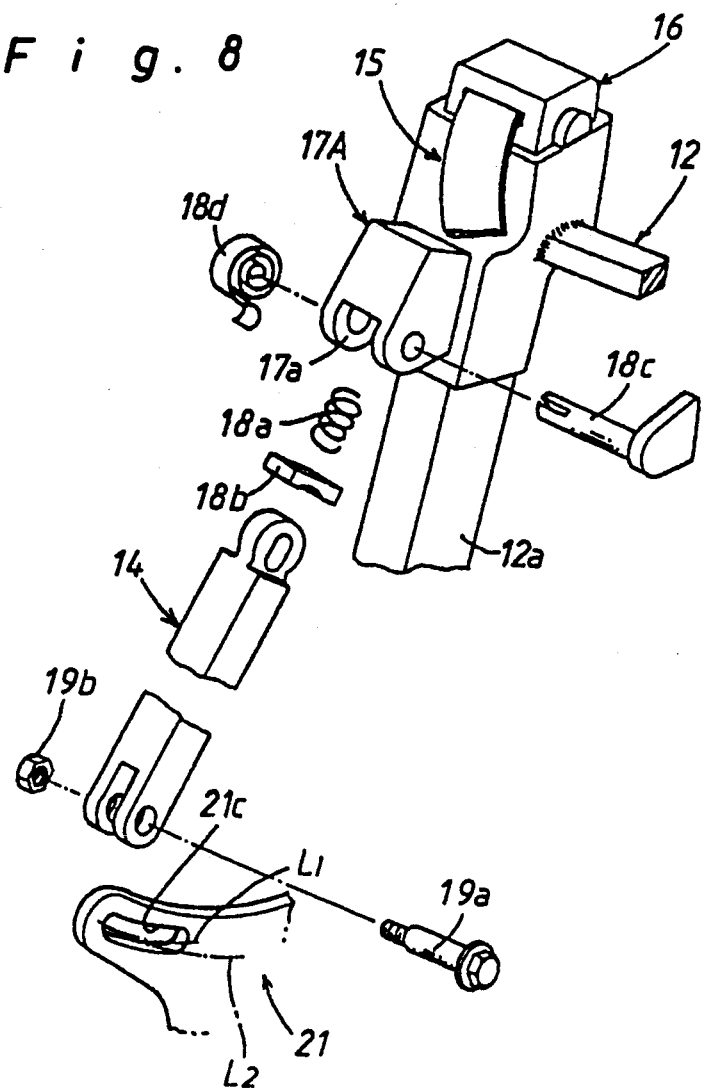
FIG. 8 is an enlarged perspective view illustrating disassembled component parts of a strut mechanism in the vehicle seat shown in FIG. 1.
Figure 9:
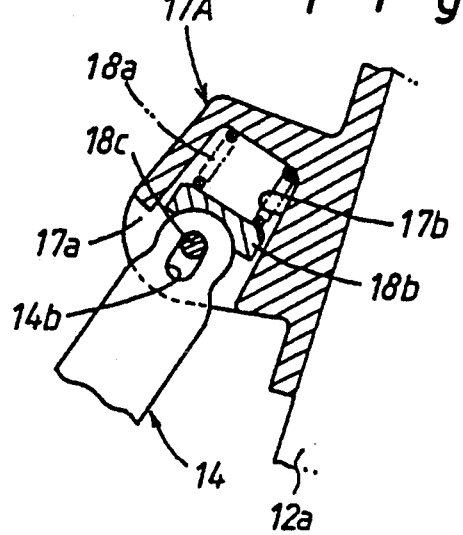
FIG. 9 is an enlarged sectional view illustrating an upper bracket shown in FIG. 8.

In FIGS. 8 and 9, there is illustrated a modification of the arrangement of the strut member 14, wherein an upper bracket 17A is replaced with the bracket 17 shown in FIG. 1. The upper bracket 17A is formed with a pair of arms 17a and a cavity 17b. The upper end of strut member 14 is disposed within the cavity 17b of bracket 17A through a compression spring 18a and a spacer 18b and is rotatably connected to the bracket 17A by means of a support pin 18c. The support pin 18c is engaged with an elongated hole 14b formed in the upper end portion of strut member 14 and carried by the arms 17a of bracket 17A. Thus, the strut member 14 is biased downward under the load of compression spring 18a. A spiral spring 18d is engaged at its inner end with the support pin 18c and at its outer end with the arm 17a of bracket 17A to bias the strut member 14 forwardly. On the other hand, the ratchet member 21 of the right-hand reclining mechanism 20 is formed at its arm portion with a semi-circular elongated hole 21c where the lower end of strut member 14 is rotatably supported by a support bolt 19a and a nut 19b fastened thereto to be moved forward or backward. In this modification, the semi-circular locus $L_1$ of elongated hole 21c is displaced upward at its rear end relative to a semi-circular locus $L_2$ of the lower end of strut member 14. Such an arrangement of the semi-circular elongated hole 21c is useful to eliminate undesired movements of the strut member 14 under the load of spring 18a.

In the above arrangement, the lower end of strut member 14 is normally positioned at the forward end of semi-circular elongaged hole 21c under the load of the compression spring 18a and spiral spring 18d. When the strut member 14 is pushed by a passenger backwardly in his ingress or egress from the vehicle compartment, the lower end of strut member 14 is moved backwardly along the elongated hole 21c against the load of springs 18a and 18d to permit easier ingress or egress of the passenger from the vehicle seat. When the pushing force applied to the strut member 14 is released, the lower end of strut member 14 is moved forwardly along the elongated hole 21c and retained at the forward end of elongated hole 21c under the load of springs 18a and 18d. Thus, in a condition where the passenger site on the vehicle seat, the strut member 14 acts as a reinforcement member to firmly support the backrest frame 12 against a forward force applied thereto in the occurrence of vehicle collision.

What is claimed is:

1. A vehicle seat having a backrest hinged to a seat squab frame to be tilted forwardly or backwardly with respect to the seat squab frame, comprising:

a single strut member rotatably connected at its upper end to an upper end of the backrest frame at one side thereof to be moved forwardly or backwardly;

resilient means mounted on the upper end of the backrest frame for biasing the strut member forwardly; and a support member secured to or arranged to be locked to one side of the seat squab frame at the same side as the one side of the backrest frame for supporting the lower end of the strut member, the support member being formed with a semi-circular elongated hole of which the radius center is located at a rotation fulcrum of the strut member;

wherein the lower end of the strut member is slidably engaged with the semi-circular elongated hole and is normally positioned at a forward end of the elongated hole under load of said resilient means.

2. A vehicle seat having a backrest hinged to a seat squab frame by means of a pair of reclining mechanisms to be tilted forwardly or backwardly with respect to the seat squab frame, the reclining mechanisms each including a ratchet member secured to each side of the lower end portion of the backrest frame to be locked to a support member secured to each side of the rear end portion of the seat squab frame, comprising:

a single strut member rotatably connected at its upper end to an upper end of the backrest at one side thereof to be moved forwardly or backwardly; and resilient means mounted on the upper end of the backrest frame for biasing the strut member forwardly;

wherein the ratchet member located at the same side as the one side of the backrest is formed with a semi-circular elongated hole of which the radius center is located at a rotation fulcrum of the strut member, and wherein the lower end of the strut member is slidably engaged with the semi-circular elongated hole and is normally positioned at a forward end of the elongated hole under load of said resilient means.

3. A vehicle seat as claimed in claim 2, wherein the radius of curvature of the ratchet member located at the same side as the one side of the backrest frame is determined to be larger than that of the ratchet member located at the other side of the backrest frame.

* * * * *